United States Patent [19]
Murphy

[11] Patent Number: 5,767,804
[45] Date of Patent: Jun. 16, 1998

[54] INTEGRATED RADIO DIRECTION FINDING AND GPS RECEIVER TRACKING SYSTEM

[75] Inventor: Michael D. Murphy, Sunnyvale, Calif.

[73] Assignee: Trimble Navigation Limited, Sunnyvale, Calif.

[21] Appl. No.: 490,560

[22] Filed: Jun. 15, 1995

[51] Int. Cl.⁶ .............................. H04B 7/185; G01S 5/02
[52] U.S. Cl. .............................. 342/357; 342/457
[58] Field of Search ........................ 342/357, 457

[56] References Cited

U.S. PATENT DOCUMENTS

| | | | |
|---|---|---|---|
| 4,908,629 | 3/1990 | Apsell et al. | 342/457 |
| 5,021,794 | 6/1991 | Lawrence | 342/457 |
| 5,433,111 | 7/1995 | Hershey et al. | 73/593 |
| 5,438,337 | 8/1995 | Aguado | 342/357 |
| 5,512,902 | 4/1996 | Guthrie et al. | 342/357 |
| 5,554,993 | 9/1996 | Brickell | 342/357 |

*Primary Examiner*—Theodore M. Blum
*Attorney, Agent, or Firm*—Patrick T. King

[57] ABSTRACT

An integrated radio direction finding and GPS receiver tracking system. In one embodiment, a transceiver device is attached to an object to be located. The transceiver device transmits a signal. The transmitted signal is received by a tracking unit. The tracking unit uses the received signal to determine the range and bearing of the object from the tracking unit. A position generating system is attached to the tracking unit to generate the position information of the tracking unit. The range and bearing of the object from the tracking unit and the position information of the tracking unit are transmitted from the tracking unit to a base station. The base station processes the range and bearing of the transceiver device from the tracking unit and the position information of the tracking unit to calculate the position of the object to be located.

23 Claims, 10 Drawing Sheets

INTEGRATED RADIO DIRECTION FINDING AND GPS RECEIVER TRACKING SYSTEM

TECHNICAL FIELD

This invention relates to determining the position of an object. Specifically, the present invention relates to an integrated radio direction finding and GPS receiver system for locating an object.

BACKGROUND ART

The need frequently arises to locate a lost or stolen item. One technique designed to assist with the location of a lost or stolen item is radio direction finding. In most radio direction finding applications, a signal or tone emitting component is attached to an item. Once the component becomes lost or stolen, the component is activated and begins emitting a tone or signal. Typically, multiple detectors located in respective vehicles search for the tone or signal emitted from the component. Commonly, each of the receiving detectors, within reception range of the tone or signal, measures the signal strength and roughly estimates the distance or range of the signal emitting component from the detector. Additionally, each of the multiple detectors roughly determines the direction or bearing from which the signal or tone emanates. The operators of the detector-equipped vehicles frequently communicate with each other to compare range and bearing information and thereby attempt to pinpoint the location of the missing item. In some instances, a display terminal is used to visually represent the range and bearing of the item with respect to the detector. Thus, prior art location techniques such as radio direction finding require multiple detectors; require considerable communication between operators of each of the detectors; and require extensive operator training for the system to be employed. Additionally, due partly to the substantial interaction required between multiple operators, such prior art techniques do not always expediently provide an estimated location of the missing item.

In one type of deployment, tone or signal emitting components are installed on automobiles. Detectors are then installed on numerous police squad cars. Due to the high cost of equipping multiple police squad cars with such detector systems, substantial up front expense is accrued when using such prior art locating systems. Prior art locating system also require that police officers receive extensive instruction regarding the use of the detectors. Therefore, in addition to substantial initial equipment costs, numerous "person-hours" are required to educate police officers, and numerous "police-hours" are spent being educated in the use of the system. After installation and education requirements are met, should a component equipped automobile become lost or stolen, police officers in multiple detector-equipped squad cars cooperatively seek to locate the missing automobile. Such cooperative efforts require the officers to communicate with each other, typically over a police radio channel, and require the police officers to neglect other duties which may require their attention.

Thus, a need exists for a system to locate a lost or stolen object wherein the system does not require numerous expensive detectors; wherein the system does not require substantial education of numerous users; wherein the system does not require the attention of an occupant of a detector-equipped vehicle; wherein the system does not require direct communication between occupants of separate detector-equipped vehicles; and wherein the system can expediently locate the lost or stolen item.

DISCLOSURE OF THE INVENTION

It is therefore an object of the present invention to provide a system to locate a lost or stolen object wherein the system does not require numerous expensive detectors; wherein the system does not require substantial education of numerous users; wherein the system does not require the attention of an occupant of a detector-equipped vehicle; wherein the system does not require direct communication between occupants of separate detector-equipped vehicles; and wherein the system can expediently locate the lost or stolen item. The above object has been achieved by an integrated radio direction finding and GPS receiver system employing a central base station.

In one embodiment of the invention, a transceiver device is attached to an object to be located. Once the item is determined to be lost or stolen, a tracking unit is used to activate the transceiver device. In the present embodiment, activation of the transceiver device is accomplished using a command signal emitted from the tracking unit. The signal transmitted by the transceiver device is received by a tracking unit. The tracking unit uses the received signal to determine the range and bearing of the object from the tracking unit. A position generating system attached to the tracking unit automatically generates position information of the tracking unit when the tracking unit receives the signal from the transceiver device. The range and bearing of the object from the tracking unit and the position information of the tracking unit are automatically transmitted from the tracking unit to a base station. The base station processes the range and bearing of the transceiver device from the tracking unit and the position information of the tracking unit to calculate the position of the object to be located. In one embodiment, the position of the object is transmitted from the base station to the tracking unit. Thus, the present invention automatically determines the location of a lost or stolen object, and does not require extensive intervention by multiple parties. Furthermore, the present invention does not require the numerous expensive detectors found in prior art location systems.

In another embodiment, tracking units are installed on at least one vehicle. As the vehicle proceeds along its daily route, the tracking unit repeatedly determines the range and bearing of the object from the tracking unit. The range and bearing of the object from the tracking unit along with the current position information of the tracking unit is transmitted to a base station. As in the previous embodiment, the base station uses the received information to calculate the position of the object. Therefore, the present invention is able to determine the location of an object without any intervention by, or even without the knowledge of, the occupant of a tracking unit-equipped vehicle. Thus, the present invention eliminates the need for education of the occupant of the tracking unit-equipped vehicle. Furthermore, the present invention is able to locate an object without altering the daily route of a vehicle. Additionally, the present invention eliminates the need for communication between occupants of tracking unit-equipped vehicles.

Therefore, the present invention provides a system to locate a lost or stolen object wherein the system does not require numerous expensive detectors; wherein the system does not require substantial education of numerous users; wherein the system does not require the attention of an occupant of a detector-equipped vehicle; wherein the system does not require direct communication between occupants of separate detector-equipped vehicles; and wherein the system can expediently locate the lost or stolen item. These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1A:
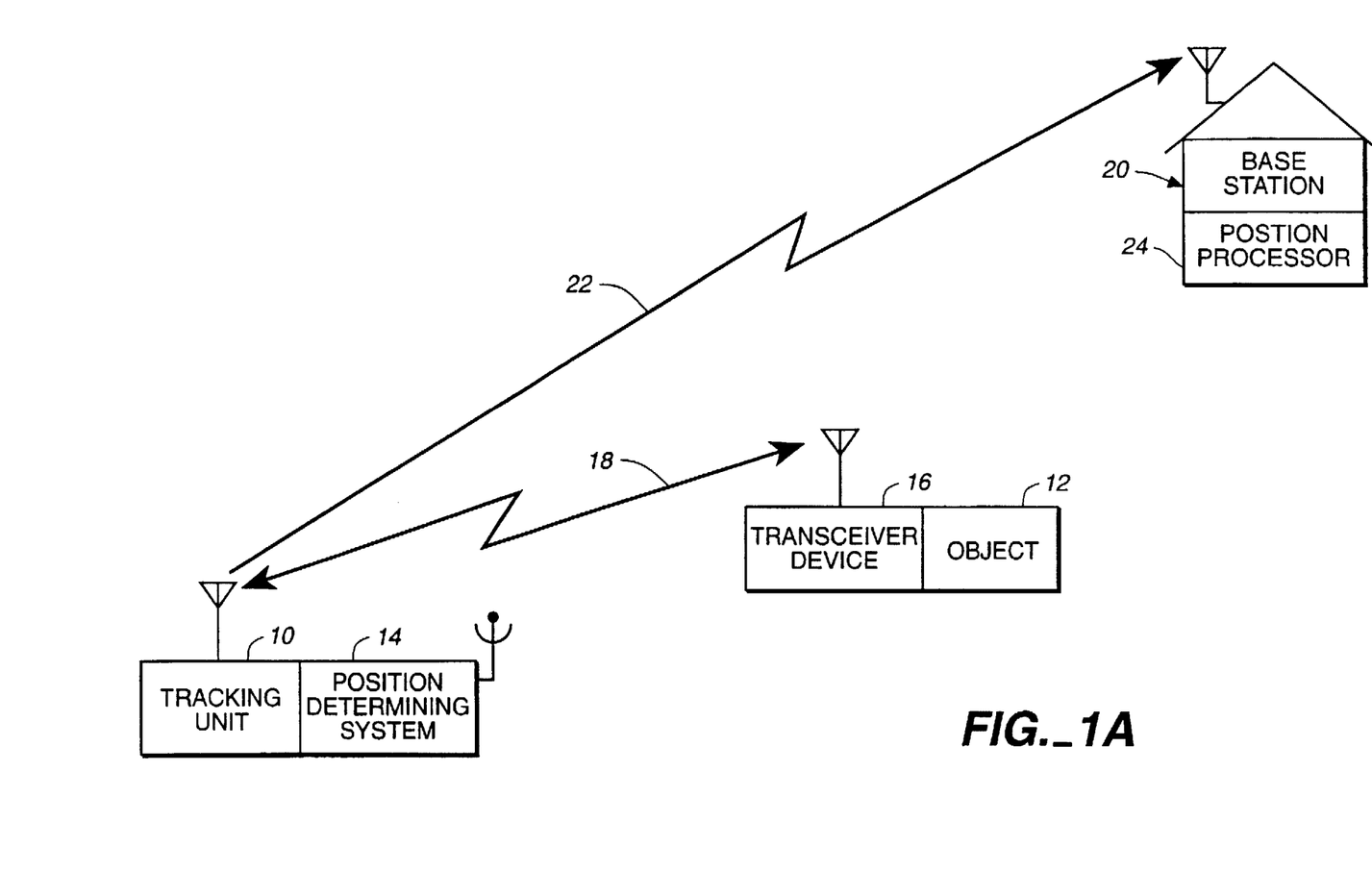
FIG. 1A is a schematic view of an integrated radio direction finding and GPS receiver tracking system in accordance with the present claimed invention.

With reference now to FIG. 1A, one embodiment of the present invention is shown in which a single stationary tracking unit 10 is used to determine the location of a lost or stolen object 12. As shown in FIG. 1A, tracking unit 10 has a position determining system 14 attached thereto. Typically, position determining system 14 generates position information indicating the latitude, longitude, and altitude of tracking unit 10. Position determining system 14 also accurately determines the time at which tracking unit 10 is at a specific location. Because tracking unit 10 is stationary in the present embodiment, the position location information of tracking unit 10 remains unchanged unless tracking unit 10 is moved to a new location.

A transceiver device 16 is attached to object 12. Object 12 can be any item to which transceiver device 16 can be attached. Although the present invention is well suited to attaching transceiver device 16 to vehicles, the present invention is also well suited to having transceiver device 16 attached to material valuables, to children, to pets, and the like. Additionally, the present invention is well suited to having transceiver device 16 clandestinely coupled to object 12. By concealing the attachment of transceiver device 16 to object 12, the present invention prevents transceiver device 16 from being visually detected and removed from object 12.

Upon being activated, transceiver device 16 emits a signal therefrom. In the present embodiment, transceiver device 16 is activated by an activation signal transmitted from tracking unit 10. That is, once object 12 is reported missing, tracking unit 10 transmits an activation signal via communication link 18 which causes transceiver device 16 to begin transmitting a signal. Although activation of transceiver device 16 is caused by the reception of a signal transmitted from tracking unit 10, the present invention is also well suited to various other methods of activating the transmission of a signal from transceiver device 16. Specifically, transceiver device is well suited, for example, to being automatically activated upon moving outside of a predetermined geographic perimeter or zone, upon being moved when transceiver device 16 is expected to remain stationary, and the like.

After transmitting an activation signal, tracking unit 10 listens for the signal transmitted from transceiver device 16. Once tracking unit 10 detects the signal from transceiver device 16, tracking unit 10 measures the strength of the signal transmitted from transceiver device 16. Based upon the strength of the received signal, tracking unit 10 determines the distance or range of transceiver device 16, and attached object 12, from tracking unit 10. Tracking unit 10 also determines the direction or bearing from which the signal is being transmitted. Thus, the present invention determines the distance of object 12 from tracking unit 10, and the direction of transceiver device 16 relative to tracking unit 10.

As shown in FIG. 1A, the present invention also includes a base station 20. As indicated by communication link 22, base station 18 is communicatively coupled to tracking unit 10. Additionally, base station 20 includes a position processor 24. The range and bearing of object 12 from tracking unit 10 and the position information of tracking unit 10 are transmitted from tracking unit 10 to base station 20 via communication link 22. Once the range and bearing of object 12 from tracking unit 10 and the position information of tracking unit 10 are received at base station 20, position processor 24 expediently calculates the location of object 12. In the present embodiment, because the position information of stationary tracking unit 10 remains unchanged until tracking unit 10 is moved to a new location, the position information of tracking unit 10 need only be transmitted to base station 22 once for each location at which tracking unit 10 is disposed.

Base station 20 is also well suited controlling the tracking functions of tracking unit 10. That is, base station 20 can, optionally, cause tracking unit 10 to scan a selected frequency range for a transceiver emitted signal. Once a selected frequency is detected, tracking unit 10 ceases scanning and tracks the detected signal. Likewise, base station 20 can cause tracking unit 10 to listen only for a certain signal. Thus, in the present invention base station 20 is able to control the tracking functions of tracking unit 10.

In the present invention, communication link 22 between base station 20 and tracking unit 10 is established in one of many ways. For example, communication link 22 can be established using a Metricomm Wide Area Network (WAN)

link operating at approximately 900 MHz. Communication link 22 can be established using a standard cellular telephone connection. Communication link 22 can also be established using a trunked radio system. In such a system, tracking unit 10 first contacts "headquarters" or a communication base and is assigned a communication channel. Tracking unit 10 then knows that communication between tracking unit 10 and base station 20 must take place over the assigned channel. Communication link 22 can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called by tracking unit 10, and tracking unit 10 is assigned a channel. Tracking unit 10 then bursts packet data, using, for example, ECP/IP protocol, to deliver the data to base station 20 until the data is completely transmitted or until the channel is no longer free. If the data is not completely transferred when the channel expires, communication link 22 is then established using a different channel. As yet another example, communication link 22 can be established using a Subscription Mobile Radio (SMR) system wherein tracking unit 10 has an assigned frequency for communication link 22. The present invention is also well suited to having an rf communication link 22 between tracking unit 10 and base station 20.

Although object 12 is stationary in the present embodiment, the present invention is also well suited to use in situations where object 12 is moving. When object 12 is moving, the present invention determines the heading or direction in which object 12 is moving. More specifically, the location of object 12 is determined by the present invention at various time intervals. The precise time at which object 12 is at any given location is easily determined, as the position information transmitted from tracking unit 10 is typically "time-stamped" by very precise GPS clocks. By comparing the location of object 12 at each of the various time intervals, the heading of object 12 is readily determined. Additionally, tracking unit 10 of the present invention is also well suited to measuring the Doppler shift of signals emitted from transceiver device 16 and received by tracking unit 10. By measuring the Doppler shift of signals transmitted from transceiver device 16 to tracking unit 10, the velocity of object 12 with respect to tracking unit 10 is also readily determined.

Although the position of only one object 12, having signal transmitting transceiver device 16 coupled thereto, is determined in the present embodiment, the present invention is also well suited to determining the position of numerous objects concurrently. In the present invention, when multiple objects have respective transceiver devices attached thereto, each of the respective transceiver devices has a unique identification signal associated therewith. Thus, tracking unit 10 is able to differentiate multiple transceiver devices which might be transmitting signals simultaneously. Therefore, the present invention determines both the identity and the location of an object whose transceiver device is transmitting a signal therefrom.

Thus, the present invention determines the location of a stationary or moving lost or stolen object without requiring numerous expensive detectors. Additionally, because the present embodiment of the invention uses a single stationary tracking unit 10, the present invention does not require the education of numerous users, does not require the attention of an occupant of a detector-equipped vehicle, and does not require direct communication between occupants of separate detector-equipped vehicles.

Figure 1B:
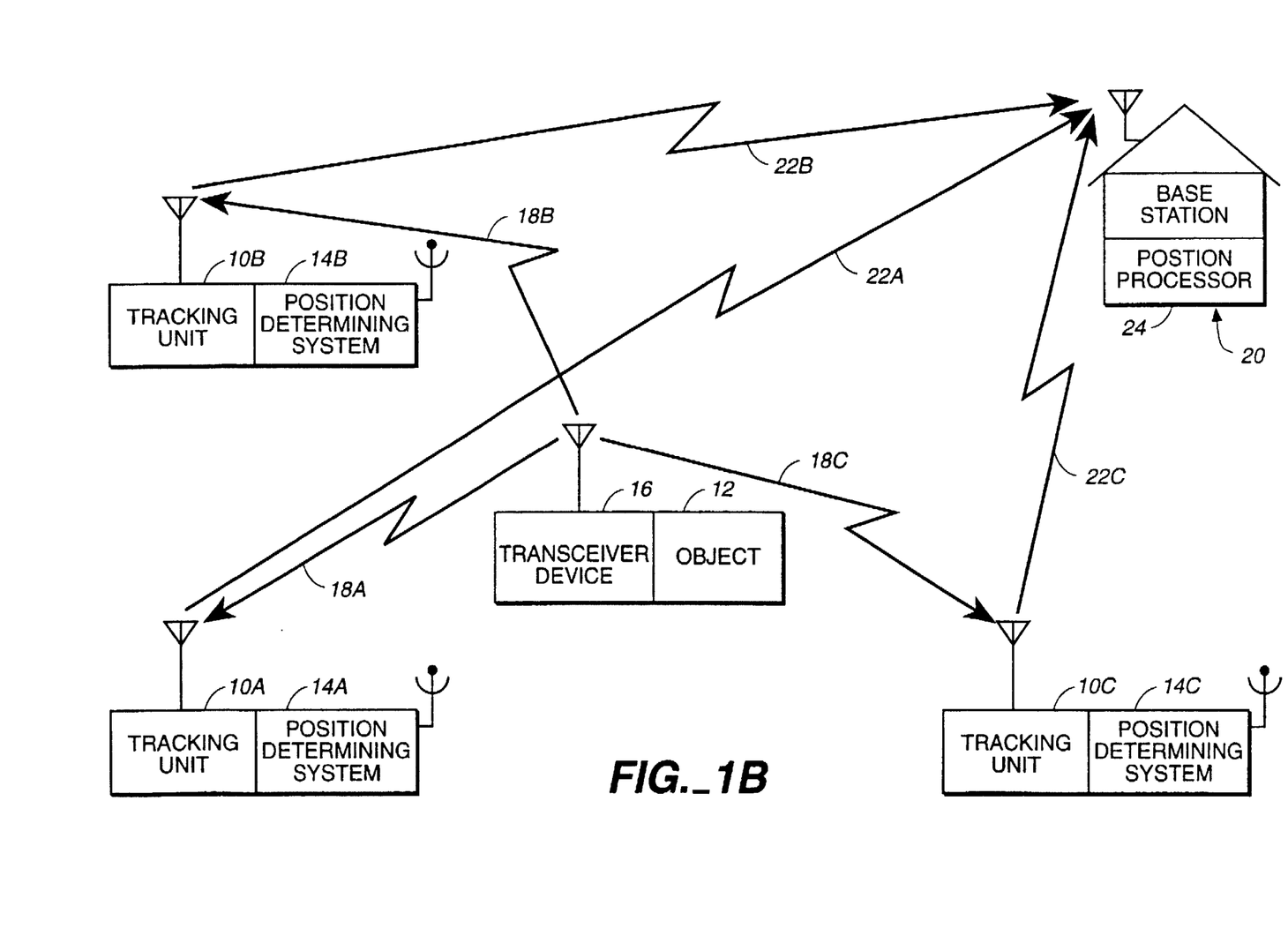
FIG. 1B is a schematic view of the stationary integrated radio direction finding and GPS receiver tracking system of FIG. 1A, including multiple stationary tracking units in accordance with the present claimed invention.

With reference next to FIG. 1B, another embodiment of the present invention is shown including multiple stationary tracking units 10a–10c. Although three tracking units 10a–10c are shown in the present embodiment, the present invention is also well suited to having various numbers of tracking units other than three. In the present embodiment, multiple stationary tracking units 10a–10c are disposed at various locations throughout a geographic region. As shown in FIG. 1B, each of tracking units 10a–10c has a position determining system 14a–14c, respectively, attached thereto. As in the previous embodiment, each of the tracking units 10a–10c generates range and bearing information of object 12 therefrom. The range and bearing information, along with the position information of the tracking unit, is transmitted to the base station 20. In the present embodiment, the range, bearing, and position information is transmitted from tracking units 10a–10c to base station 20 via communication links 22a–22c, respectively. Communications links 22a–22c are established as described in conjunction with the embodiment of FIG. 1A. Once the range and bearing of object 12 from each of tracking units 10a–10c and the position information of tracking units 10a–10c are received at base station 20, position processor 24 expediently calculates the location of object 12. By employing more than one stationary tracking unit, the precise position of object 12 is more easily calculated by base station 20. As in the previous embodiment, the present invention also determines the heading and the velocity of a moving object.

Although tracking units 10a–10c communicate with one base station 20 in the present embodiment, the present invention is also well suited to having tracking units 10a–10c communicate with more than one base station. Additionally, the present invention is also well suited to having tracking units 10a–10c communicate with different respective base stations. Furthermore, depending upon the position of object 12, it is possible that not all of tracking units 10a–10c will be able to receive the signal transmitted from transceiver device 16. That is, object 12 may be located such that fewer than all of tracking units 10a–10c are within reception range of transceiver device 16. The present invention however, is well suited to determining the location of object 12 even when as few as one of tracking units 10a–10c are within reception range of transceiver device 16.

Figure 2:
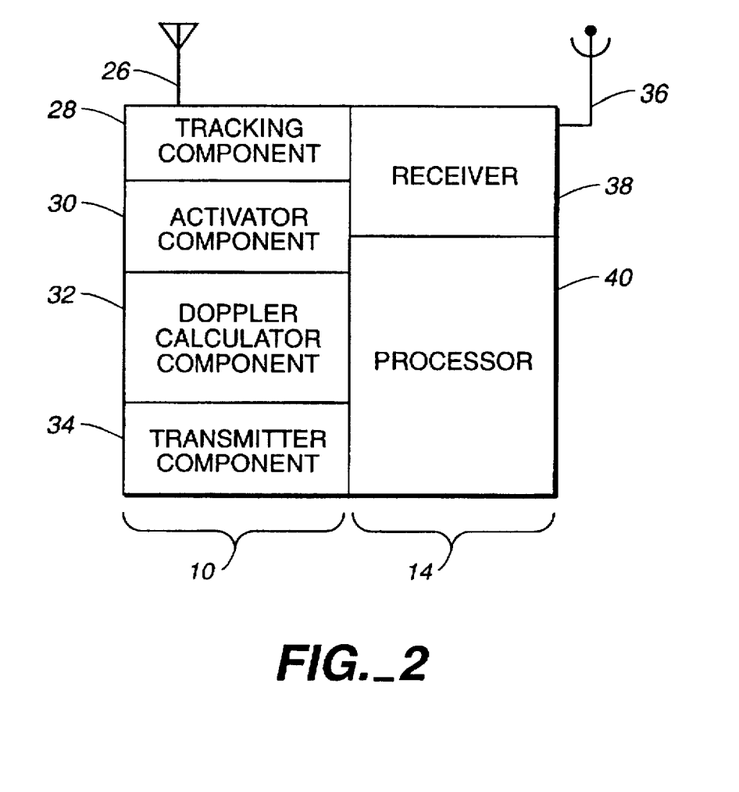
FIG. 2 is a detailed schematic view of a tracking unit having a position determining system attached thereto in accordance with the present claimed invention.

With reference next to FIG. 2 a detailed schematic view is shown of a tracking unit 10 having a position determining system 14 attached thereto. As shown in the embodiment of FIG. 2, tracking unit 10 includes a multi-directional transceiver antenna 26 which receives and transmits signals. Tracking unit 10 also includes a tracking component 28 which calculates the range and bearing of object 12 from tracking unit 10. Activator component 30 is used, in the present embodiment, to cause a transceiver device activation signal to be transmitted from multi-directional antenna 26. Tracking unit 10 also contains a Doppler calculator component 32 for measuring the Doppler shift of signals transmitted to tracking unit 10 from a transceiver device, not shown. Tracking unit 10 also contains a transmitter component 34 for controlling the transmission of information from tracking unit 10 to base station 20, not shown.

With reference still to FIG. 2, a detailed schematic view of position determining system 14 is shown coupled to tracking unit 10. Position determining system 10 includes a multi-directional antenna 36 coupled to a receiver 38 for receiving the radio-navigation signals. The received radio-navigation signals are then processed by processor 40 to determine the position information of tracking unit 10. In the present invention, position determining system 14 is, for example, a satellite-based radio navigation system such as the Global Positioning System (GPS), or the Global Orbiting Navigational System (GLONASS). Although such systems are specifically mentioned in the present embodiment, the present invention is also well suited to land-based radio navigation systems such as, for example, LORAN, Shoran, and Decca. Additionally, the present invention is also well suited to recording GPS ephemeris data. Likewise the present invention is also well suited to recording position information which has undergone differential corrections to provide more accurate position information.

Position determining system 14 is also able to generate velocity information for a moving tracking unit by measuring the Doppler shift of signals between the antenna of position determining system 14 and at least one radio navigation signal transmitter, for example, one of the GPS satellites, not shown. Thus, components of tracking unit 10 such as speed, direction, and heading are obtained by position determining system 14. Additionally, position determining system 12 very accurately determines the time at which tracking unit 10 is at any specific location.

Figure 3:
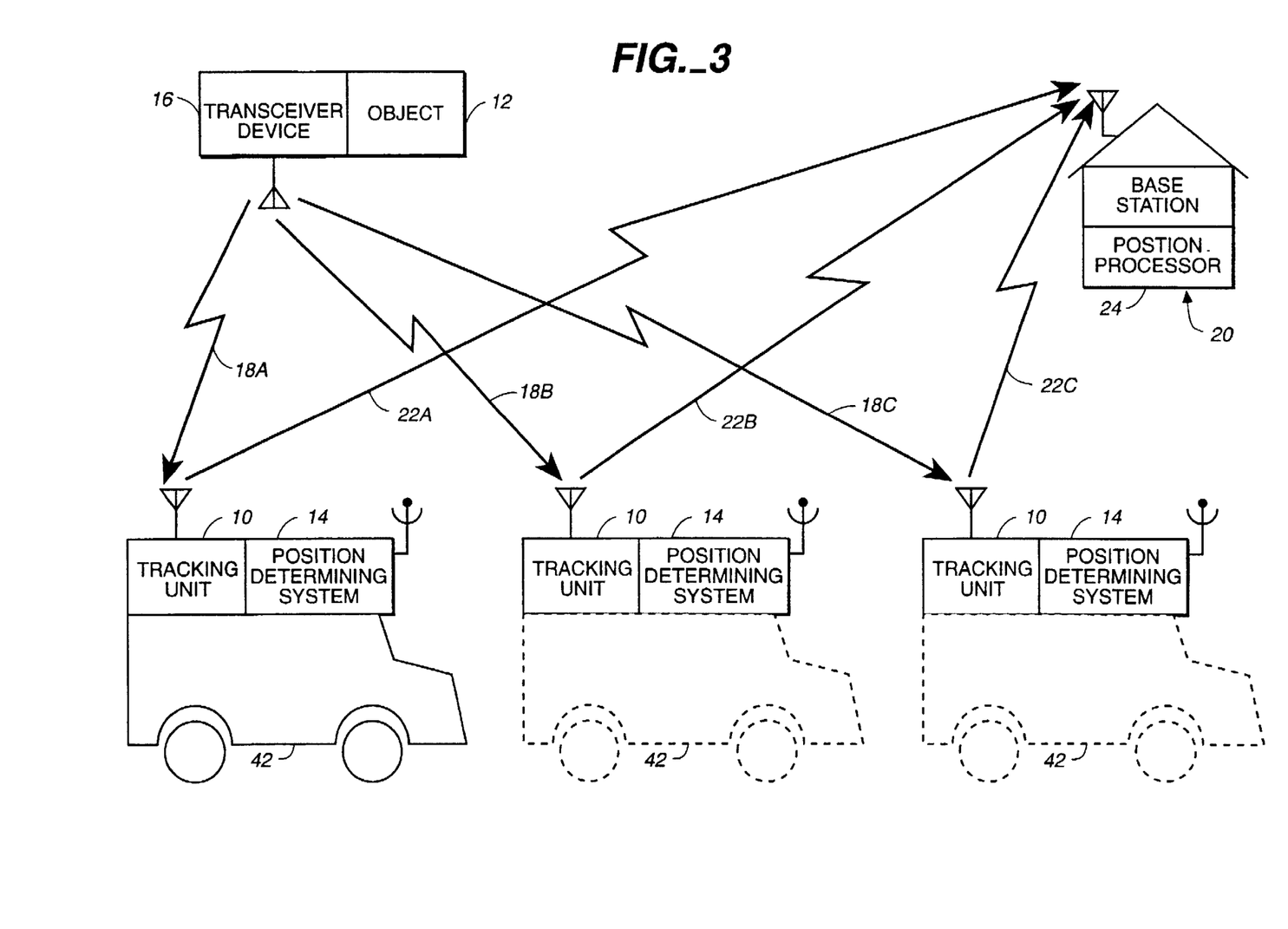
FIG. 3 is a schematic view of an integrated tracking unit and position determining system attached to a vehicle in accordance with the present claimed invention.

With reference next to FIG. 3, another embodiment of the present invention is shown in which a tracking unit 10 is coupled to a vehicle 42. As described in detail above, tracking unit 10 listens for the signal transmitted from transceiver device 16. Once tracking unit 10 detects the signal from transceiver device 16, tracking unit 10 measures the strength of the signal transmitted from transceiver device 16. Based upon the strength of the received signal, tracking unit 10 determines the distance or range of transceiver device 16, and attached object 12, from tracking unit 10. Tracking unit 10 also determines the direction or bearing from which the signal is being transmitted. Thus, the present invention determines the distance of object 12 from tracking unit 10, and the direction of transceiver device 16 relative to tracking unit 10.

As shown in FIG. 3, the present invention also includes a base station 20 with a position processor 24. Base station 20 is communicatively coupled to tracking unit 10 by communication links 22a–22c. Communication links 22a–22c are established in a manner as described above in conjunction with the embodiment of FIG. 1A. In the present embodiment, a signal is transmitted from transceiver device 16 to tracking unit 10 at Location A, Location B, and Location C over communication links 22a, 22b, and 22c. In the present embodiment, range and bearing information is separately determined by tracking unit 10 when vehicle 42 is at Location A, Location B, and Location C. The range and bearing information generated by tracking unit 10 is transmitted to base station 20 along with the position information for each location at which the range and bearing information was obtained. The range and bearing of object 12 from tracking unit 10 and the position information of tracking unit 10 are transmitted from tracking unit 10 to base station 20 via communication links 22a–22c. Thus, in the present embodiment a single tracking unit 10 generates multiple range and bearing readings corresponding to a respective plurality of locations. Position processor 24 of base station 20 uses the multiple range and bearing readings and the corresponding position information of each location to accurately and expediently determine the location of object 12.

With reference still to FIG. 3, the present embodiment generates multiple range and bearing readings for object 12 using a single movable tracking unit 10. Hence, in the present embodiment, single tracking unit 10 generates quantities of range and bearing information similar to that of a system employing multiple stationary tracking units.

Additionally, the present invention does not require any intervention on the part of the driver or other occupants of vehicle 42. That is, the present embodiment automatically transmits range, bearing and position information to base station 20 at various intervals without any effort on the part of the driver or occupants of the vehicle. Thus, the present invention does not require any education or training of the driver or occupants of tracking unit-equipped vehicle 42. Furthermore, the present invention is well suited to providing to the driver/occupants of vehicle 42 access to position determining system 42. As a result, the present invention provides to the driver/occupants of vehicle 42 an incentive to or reward for having tracking unit 10 and position determining system 14 attached to vehicle 42.

In the present embodiment, range and bearing information is transmitted to base station 20 at 5 mile intervals. Specifically, initial range, bearing, and position information is transmitted from vehicle 42 at Location A to base station 20. When vehicle 42 has traveled a preselected distance of, for example, 5 miles from Location A, a second set of range, bearing, and position information is transmitted from vehicle 42 at Location B to base station 20. Likewise, when vehicle 42 has again traveled a preselected distance of, for example, 5 miles from Location B, a third set of range, bearing, and position information is transmitted from vehicle 42 at Location C to base station 20. In the present embodiment, the intervals at which range, bearing, and position readings are transmitted to base station 20 are determined by the distance vehicle 42 has traveled. Furthermore, position determining system 14 measures the distance vehicle 42 travels. Although, a 5 mile distance is used as the interval of information transmission in the present embodiment, the present invention is also well suited to having numerous factors regulate the interval at which range, bearing, and position information is transmitted from vehicle 42 to base station 20. As an example, the present invention is well suited to regulating the transmission of range, bearing, and position information from vehicle 42 to base station 20 based upon the speed of vehicle 42, the distance of vehicle 42 from object 12, the heading of vehicle 42 with respect to object 12, and the like.

With reference still to FIG. 3, as described above, the present embodiment is also well suited to use in situations where object 12 is moving. Similarly, as described above, the present invention is also well suited to determining the position of numerous objects concurrently wherein each of the respective transceiver devices has a unique identification signal associated therewith.

In the present embodiment, the calculated location of object 12 can be handled in many ways. That is, for example, the calculated location of object 12 can be transmitted from base station 12 to a dedicated search vehicle which would then recover object 12. As another example, the calculated location of object 12 can be stored at base station 12 until the calculated location of object 12 is requested by a search unit. As yet another example, the calculated position of object 12 can also be transmitted from base station 20 to, for example, a police vehicle. If desired, the present invention is also well suited to having the calculated position of object 12 transmitted to the tracking unit-equipped vehicle 42.

As an additional benefit, in one embodiment of the present invention, tracking unit 10 is detachable and portable. As a result of being portable, an occupant of vehicle 42 is able to carry tracking unit 10 away from vehicle 42 if desired. Thus, should the occupant of vehicle 42, for example, become lost or injured, base station 20 is able to determine the exact location of the occupant. Locating the exact position of the person carrying tracking unit 10 is extremely beneficial to persons such as, for example, police officers or utility workers who frequently encounter dangerous situations.

With reference still to FIG. 3, because the present invention does not interfere with the driver or occupant of a vehicle, the present invention is well suited to being located on numerous types of vehicles. The present embodiment, however, is especially well suited to being placed on a vehicle which frequently travels throughout a selected geographic region. For example, tracking unit 10 is well suited to being placed on a patrolling police squad car. As another example, tracking unit 10 is well suited to being located on a taxi. Hence, the present invention is well suited to being placed on, for example, a bus, an ambulance, a local commuter train, a delivery vehicle, a mail delivery vehicle, a school bus, and the like. In all of the above examples, the present embodiment does not does not require numerous expensive detectors; does not require substantial education of numerous users; does not require the attention of an occupant of a detector-equipped vehicle; and the system expediently locates the lost or stolen item.

Figure 4A:
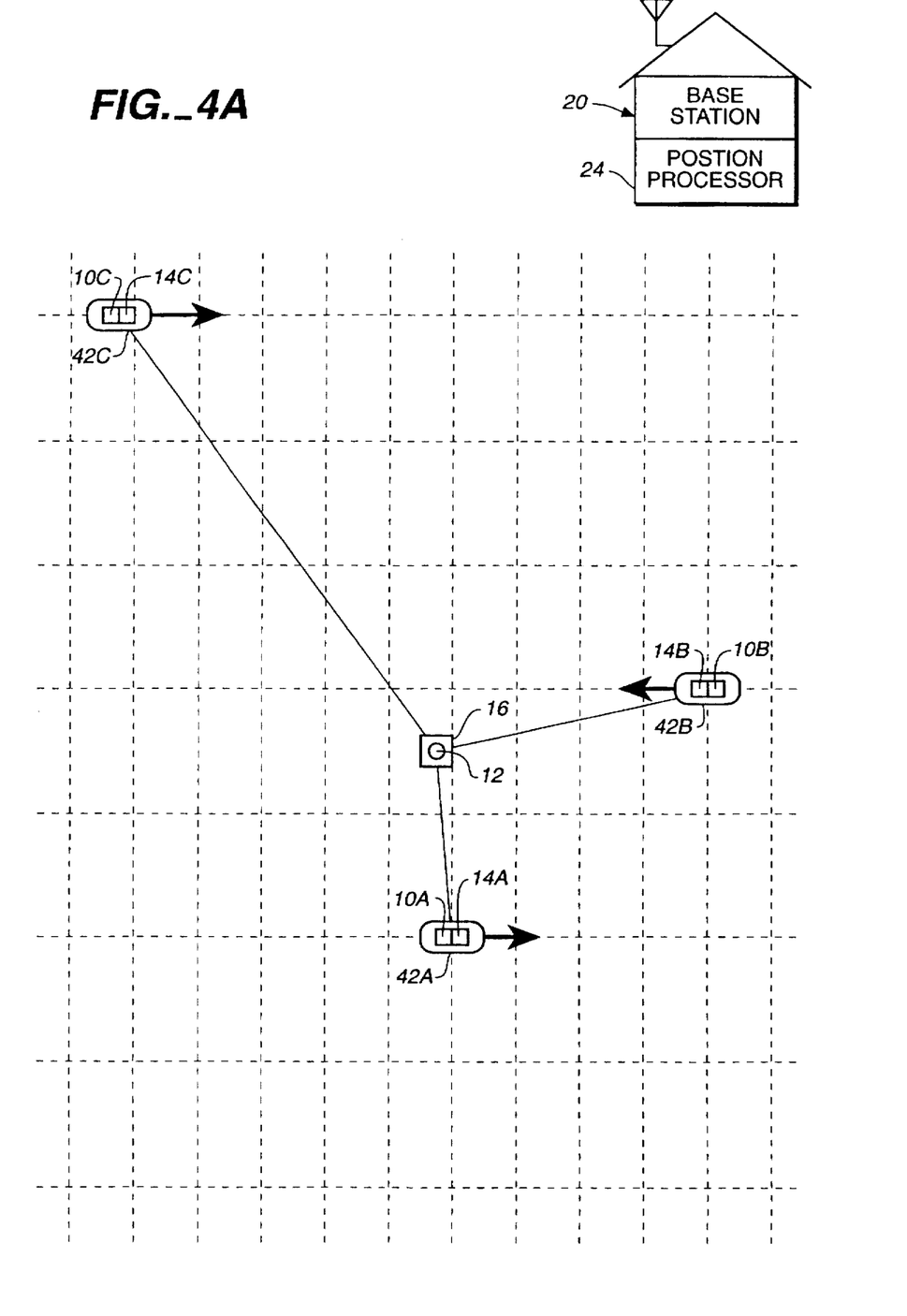
FIGS. 4A–4C are schematic views of another embodiment of the present invention in which a plurality of tracking units and position determining systems are attached to a respective plurality of vehicles in accordance with the present claimed invention.
Figure 4B:
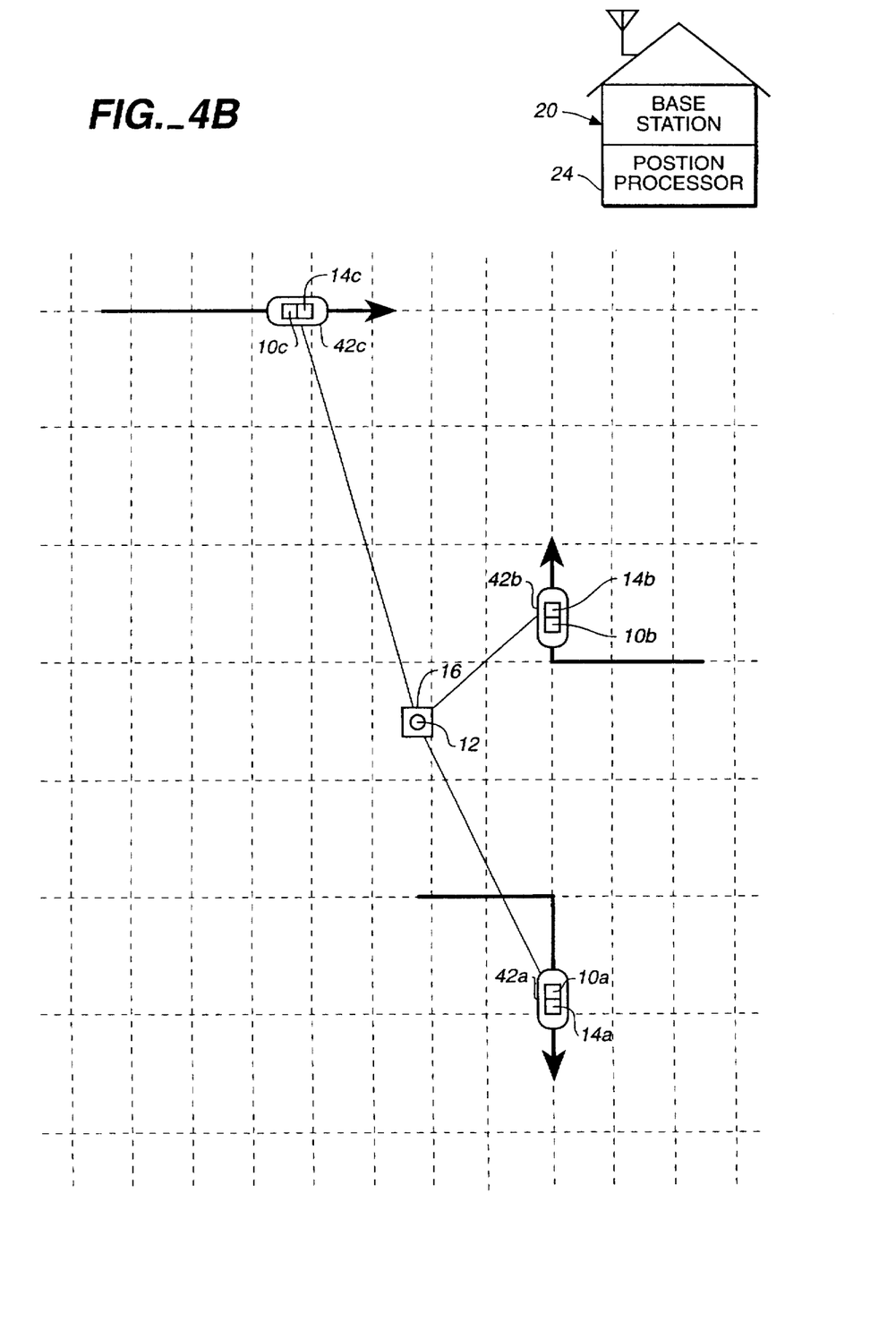
Figure 4C:
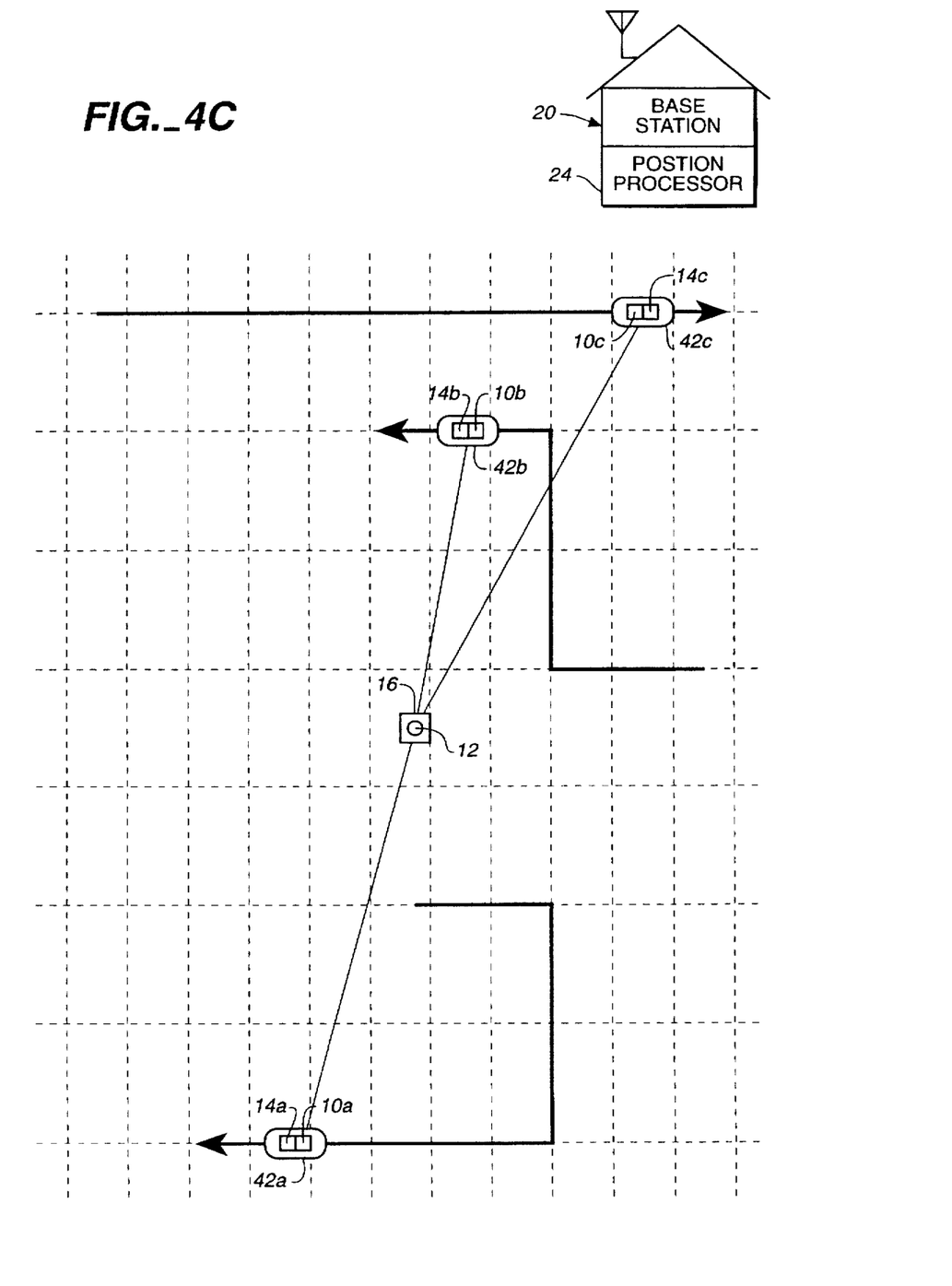

With reference next to FIGS. 4A–4C, another embodiment of the present invention is shown in which a plurality of tracking units 10a–10c and position determining systems 14a–14c are attached to a respective 42a–24c receive a signal from transceiver device 16 attached to object 12. Each of vehicles 42a–42c then generates range and bearing information corresponding to the received signal. The range and bearing information along with the position information of the vehicle is then transmitted to base station 20. The range, bearing, and position information is transmitted from each of vehicles 42a–42c via communication links, not shown. The communication links, not shown are established in a manner as described above in conjunction with the embodiment of FIG. 1A.

As stated above, base station 20 is also well suited controlling the tracking functions of tracking units 10a–10c. That is, base station 20 can, optionally, cause tracking units 10a–10c to scan a selected frequency range for a transceiver emitted signal. Once a selected frequency is detected, tracking units 10a–10c cease scanning and track the detected signal. Likewise, base station 20 can cause tracking units 10a–10c to listen only for a certain signal. Thus, in the present invention base station 20 is able to control the tracking functions of tracking units 10a–10c.

As shown in FIG. 4B, each of vehicles 42a–42c also receive a signal from transceiver device 16 after vehicles 42a–42c have moved a certain distance. At their respective new position, each of vehicles 42a–42c generates range and bearing information corresponding to the received signal. The range and bearing information along with the position information of the vehicle at the new location is transmitted to base station 20. Thus, additional range and bearing information is provided to base station 20 by moving the vehicles 42a–42c to which the plurality of tracking units 10a–10b are respectively attached. Again, as shown in FIG. 4C, each of vehicles 42a–42c also receive a signal from transceiver device 16 after vehicles 42a–42c have again moved a certain distance. At their respective new location, each of vehicles 42a–42c generates range and bearing information corresponding to the received signal. The range and bearing information along with the position information of the vehicle at the new location is transmitted to base station 20.

With reference still to FIGS. 4A–4C, the position processor 24 at base station 20 calculates the position of object 12 using the range, bearing, and position information transmitted from each of vehicles 42a–42c at their various locations. By moving the location of tracking units 10a–10c, the present embodiment provides a substantial quantity of range and bearing information to base station 20. The substantial quantity of information allows position processor 24 to accurately and quickly determine the position of object 12.

In the present embodiment, the intervals at which range, bearing, and position readings are transmitted to base station 20 are determined by the distance vehicles 42a–42c have traveled. Furthermore, position determining systems 14a–14c measure the distance vehicles 42a–42c, respectively, have traveled. Although, distance is used as the interval of information transmission in the present embodiment, the present invention is also well suited to having numerous factors regulate the interval at which range, bearing, and position information is transmitted from vehicles 42a–42c to base station 20. As an example, the present invention is well suited to regulating the transmission of range, bearing, and position information based upon the speed of vehicles 42a–42c, the distance of vehicles 42a–42a from object 12, the heading of vehicles 42a–42c with respect to object 12, and the like. Additionally, the present embodiment is also well suited to having the range, bearing, and position information transmitted from vehicles 42a–42c at different times. That is, range, bearing, and position information can be transmitted from vehicles 42a at a time other than when such information is transmitted from vehicles 42b or 42c. Furthermore, the present invention is also well suited to having various numbers of tracking units other than three. By employing more than one mobile tracking unit, the precise position of object 12 is more easily calculated by base station 20.

Although tracking units 10a–10c communicate with one base station 20 in the present embodiment, the present invention is also well suited to having tracking units 10a–10c communicate with more than one base station. Additionally, the present invention is also well suited to having tracking units 10a–10c communicate with different respective base stations. Furthermore, depending upon the position of object 12, it is possible that not all of tracking units 10a–10c will be able to receive the signal transmitted from transceiver device 16. That is, object 12 may be located such that fewer than all of tracking units 10a–10c are within reception range of transceiver device 16 at any given time. The present invention, however, is well suited to determining the location of object 12 even when as few as one of tracking units 10a–10c are within reception range of transceiver device 16. Also, as described above, the present invention is also well suited to determining the position of numerous objects concurrently, wherein each of the respective transceiver devices has a unique identification signal associated therewith.

With reference still to FIGS. 4A–4C, because the present invention does not interfere with the driver or occupant of a vehicle, the present invention is well suited to being located on numerous types of vehicles. The present embodiment, however, is especially well suited to being placed on a vehicles which frequently travels throughout a selected geographic region. As set forth above, tracking units 10a–10c are well suited to being placed on a patrolling police squad cars, taxis, passenger buses, ambulances, local commuter trains, delivery vehicles, mail trucks, school buses, and the like. In all of the above examples, the present embodiment does not does not require numerous expensive detectors. Instead, the present invention, at most, only requires numerous inexpensive detectors. Additionally, the present invention does not require substantial education of numerous users; does not require the attention of an occupant of a detector-equipped vehicle; does not require direct communication between occupants of separate detector-equipped vehicles; and the system expediently locates the lost or stolen item.

Figure 5A:
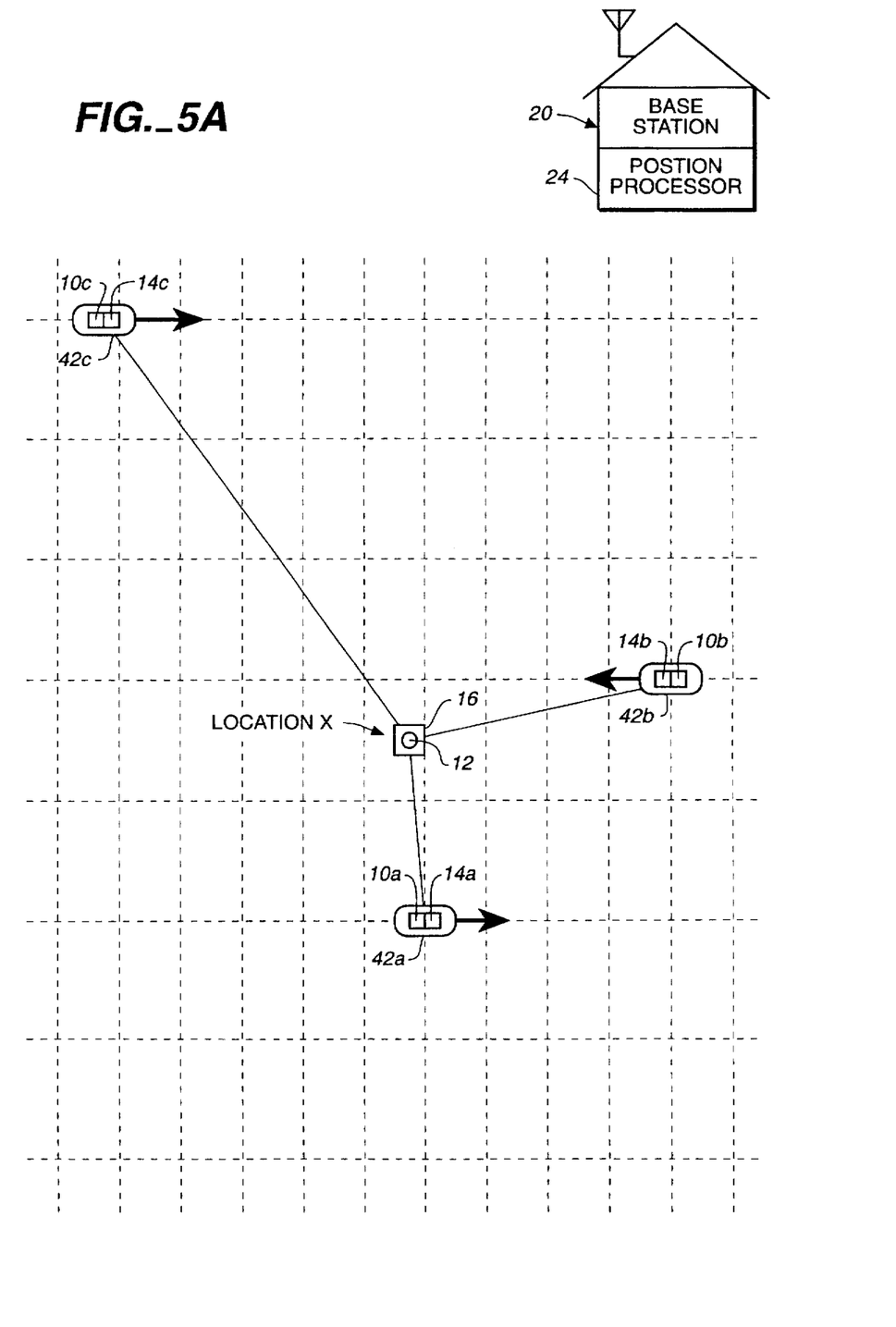
FIGS. 5A–5C are schematic views of another embodiment of the present invention in which a plurality of tracking units and position determining systems are attached to a respective plurality of vehicles in order to locate a moving object in accordance with the present claimed invention.
Figure 5B:
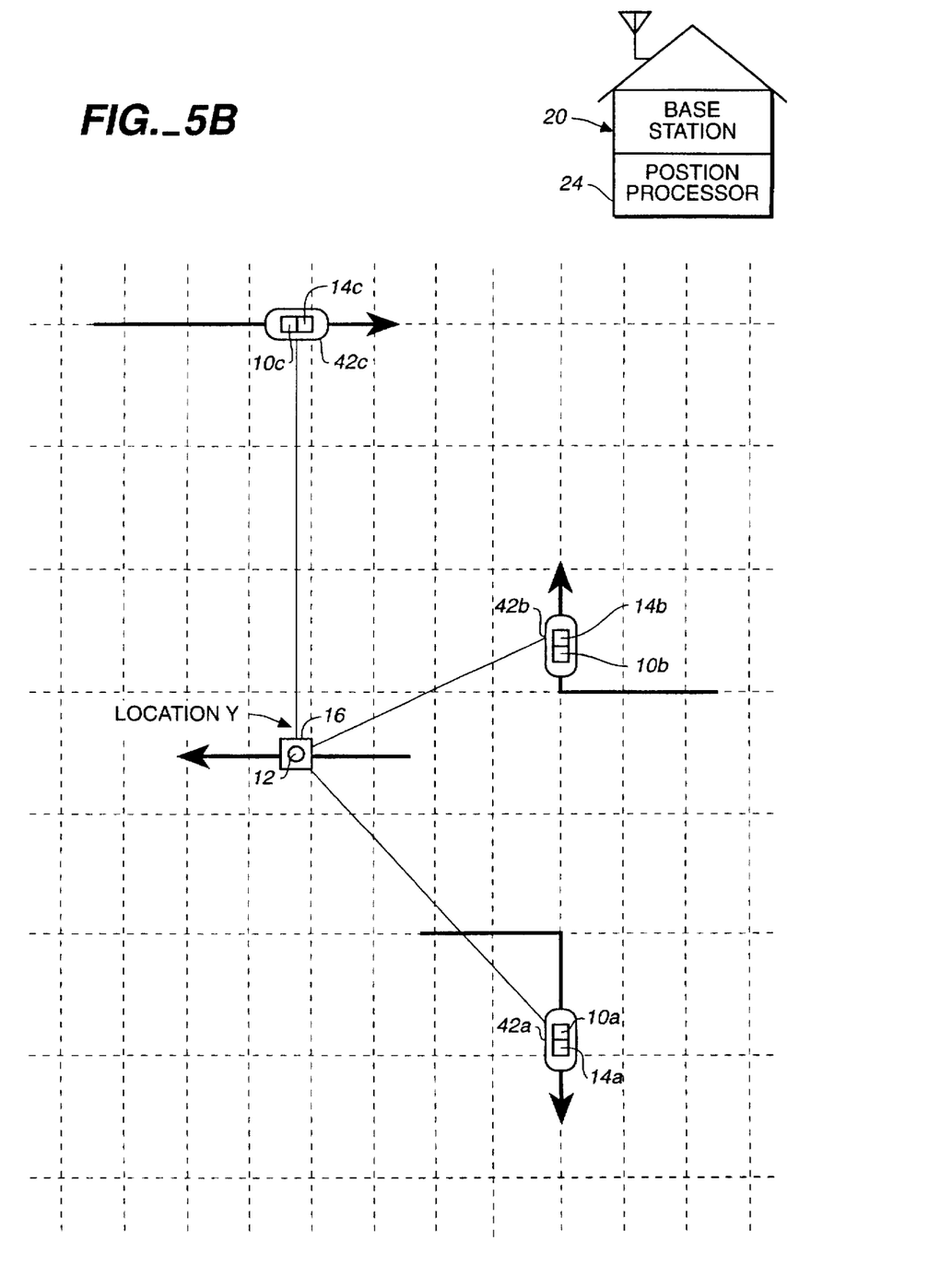
Figure 5C:
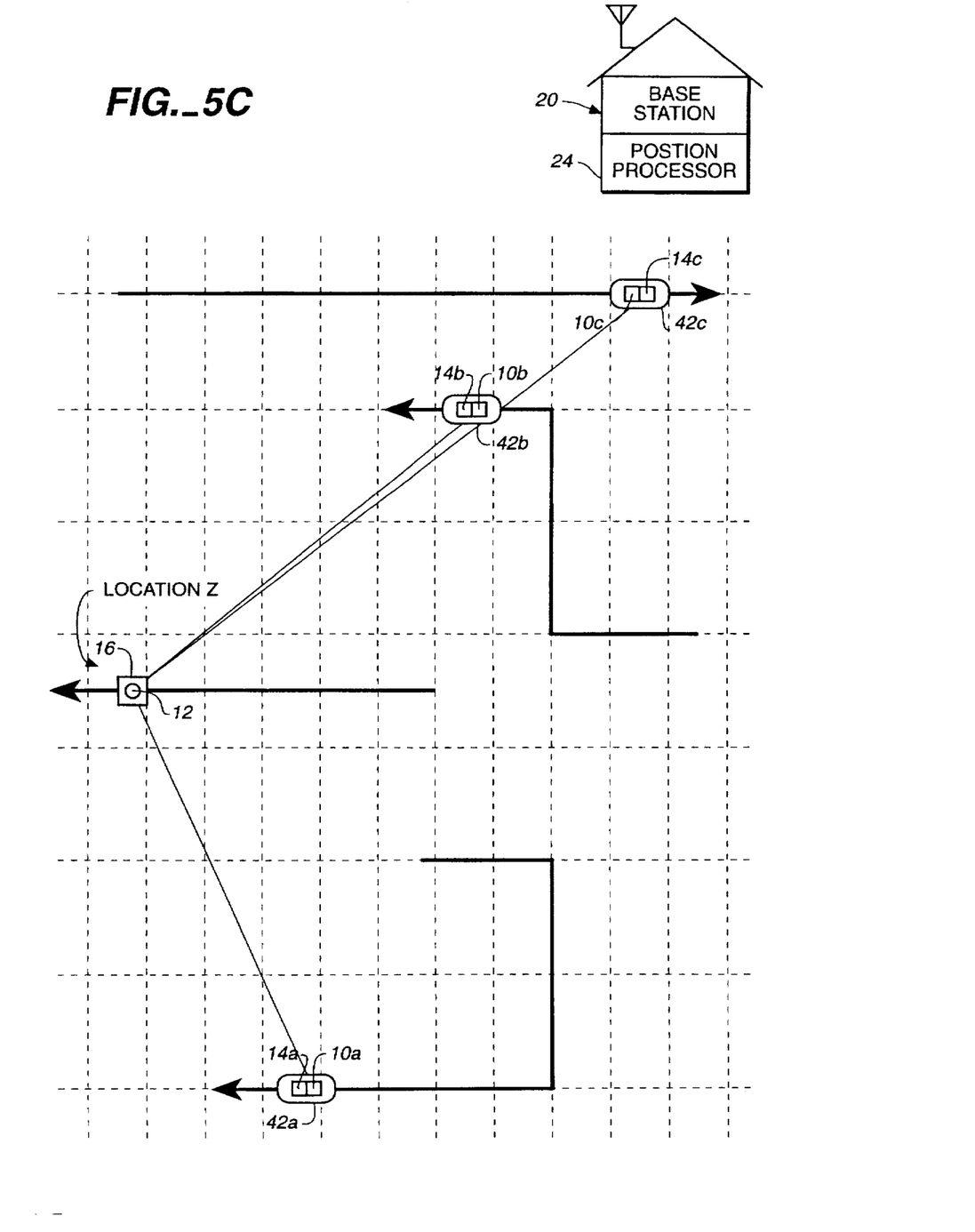

With reference next to FIGS. 5A–5C, a schematic diagram is shown wherein a plurality of tracking units 10a–10c and position determining systems 14a–14c are attached to a respective plurality of vehicles 42a–42c in order to locate a moving object 12. The location of object 12 is determined as described above in conjunction with the embodiment of FIGS. 4A–4C. However, in the present situation, object 12 is not stationary. shown in FIG. 5A object 12 and attached transceiver device 16 are first found at Location X. When the next set of range and bearing readings are taken by tracking units 10a–10c, object 12 is at Location Y. Finally, when yet another set of range and bearing readings are taken by tracking units 10a–10c, object 12 has moved to a new position, Location Z. When object 12 is moving, the present invention determines the heading or direction in which object 12 is moving. More specifically, the location of object 12 is determined by the present invention at various time intervals. The precise time at which object 12 is at any given location is easily determined, as the position information transmitted from tracking unit 10 is typically "time-stamped" by very precise GPS clocks. By comparing the location of object 12 at each of the various time intervals, the heading of object 12 is readily determined. Additionally, tracking units 10a–10c of the present embodiment are also well suited to measuring the Doppler shift of signals emitted from transceiver device 16 and received at tracking units 10a–10c. By measuring the Doppler shift of signals transmitted from transceiver device 16 to tracking units 10a–10c, the velocity of object 12 with respect to tracking units 10a–10c is also readily determined. Thus, the present invention not only determines the location of a stationary object, but also determines the current position, heading, and velocity of a moving object.

Several advantages are provided by the present invention. For example, the present does not require extensive intervention by multiple parties. That is, the present invention does not require the attention, or even the knowledge of, the occupant of a tracking unit-equipped vehicle. Thus, the present invention eliminates the need for education of the occupant of the tracking unit-equipped vehicle. Even when installed, for example, on a police squad car, the present invention does not distract a police officer from official duties. Therefore, the present invention "relocates" tracking duties from police officers to the base station. Additionally, the present invention eliminates the need for communication between occupants of tracking unit-equipped vehicles. Hence, the location of an object is determined without requiring direct police intervention, or communication between, for example, police officers.

As an additional benefit, in one embodiment of the present invention, tracking units 10a–10c are detachable and portable. As a result of being portable, an occupants of vehicles 42a, 42b, and/or 42c are able to carry tracking units 10a–10c away from vehicles 42a–42c if desired. Thus, should the occupants of vehicles 42a–42c, for example, become lost or injured, base station 20 is able to determine the exact location of the occupants. Locating the exact position of the person carrying tracking unit 10 is extremely beneficial to persons such as, for example, police officers or utility workers who frequently encounter dangerous situations.

Furthermore, the present invention does not require the numerous expensive detectors found in prior art location systems. Because multiple range and bearing readings are obtained from each moving tracking unit, the need for numerous detectors used in the prior art is eliminated. Also, because the present invention automatically transmits range, bearing, and position information, the present invention does not require substantial education of numerous users.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method for locating an object comprising the steps of:

attaching a transceiver device to an object to be located, transmitting a signal from said transceiver device, when said transceiver device is activated;

using said tracking unit to activate said transceiver device to transmit said signal, receiving said signal transmitted by said transceiver device at a tracking unit, determining from said signal received at said tracking unit the range and bearing of said object from said tracking unit, generating position information of said tracking unit using a position determining system coupled to said tracking unit, transmitting said range and bearing of said object from said tracking unit and said position information of said tracking unit from said tracking unit to a base station, and processing at said base station said range and bearing of said transceiver device from said tracking unit and said position information of said tracking unit to calculate the position of said object to be located.

2. The method as recited in claim 1 wherein said step of coupling a transceiver device to an object to be located further includes coupling a plurality of transceiver devices to a respective plurality of objects to be located.

3. The method as recited in claim 2 wherein said step of transmitting a signal from said transceiver device further includes transmitting a different signal from each of said plurality of transceiver devices such that each of said respective plurality of objects to be located has a unique signal associated therewith.

4. The method as recited in claim 1 further including the step of:

determining the velocity of said object with respect to said tracking unit by measuring the Doppler shift of said signal transmitted by said transceiver device and received by said tracking unit.

5. The method as recited in claim 1 wherein said step of receiving said signal transmitted by said transceiver device at a tracking unit further includes receiving said signal transmitted by said transceiver device at a plurality of tracking units, each of said plurality of tracking units further adapted to determine the range and bearing of said object therefrom.

6. The method as recited in claim 1 wherein said step of receiving said signal transmitted by said transceiver device at a tracking unit further includes receiving said signal at a tracking unit disposed on a vehicle.

7. The method as recited in claim 6 wherein said step of receiving said signal at a tracking unit disposed on a vehicle further includes receiving said signal at a plurality of tracking units disposed on a respective plurality of vehicles.

8. The method as recited in claim 6 wherein said step of determining from said signal received at said tracking unit the range and bearing of said object from said tracking unit, further includes determining said range and bearing of said object from said tracking unit at a plurality of locations as said tracking unit is moved by said vehicle.

9. The method as recited in claim 8 further including receiving said signal at a plurality of tracking units at a plurality of respective locations as said plurality of tracking units are moved by said respective plurality of vehicles to a respective plurality of locations.

10. The method as recited in claim 1 wherein said step of transmitting said range and bearing of said object from said tracking unit and said position information of said tracking unit from said tracking unit to a base station further includes transmitting said range and bearing of said object from said tracking unit and said position information of said tracking unit from said tracking unit to at least one of a plurality of base stations.

11. The method as recited in claim 1 further including the step of:

transmitting said calculated position of said object from said base station to a desired location.

12. An object locating system comprising:

a transceiver device attached to an object to be located, said transceiver device transmitting a signal therefrom to a tracking unit, when said transceiver device is activated by the tracking unit;

said tracking unit having an activator to activate said transceiver device such that said transceiver device transmits said signal, said tracking unit receiving said signal transmitted by said transceiver device, said tracking unit including a tracking component for determining the range and bearing of said transceiver device from said tracking unit, said tracking unit further including a transmitter integral therewith, a position determining system attached to said tracking unit, said position determining system generating position information for the location of said tracking unit, and a base station communicatively coupled to said tracking unit, said base station receiving said range and bearing of said transceiver device using the transmitter of said tracking unit and said position information for the location of said tracking unit when such information is transmitted from said transmitter of said tracking unit, said base station further including a position processor for calculating the position of said object to be located using said received range and bearing of said transceiver device from said tracking unit and said position information for the location of said tracking unit.

13. The object locating system of claim 12 further including a plurality of transceiver devices coupled to a respective plurality of objects to be located.

14. The object locating system of claim 13 wherein each of said plurality of transceiver devices transmits a different signal therefrom such that each of said respective plurality of objects has a unique signal associated therewith.

15. The object locating system of claim 12 wherein said tracking unit is further includes a Doppler calculator for determining the velocity of said object with respect to said tracking unit by measuring the Doppler shift of said signal transmitted by said transceiver device and received by said tracking unit.

16. The object locating system of claim 12 further including a plurality of tracking units adapted to receive said signal transmitted by said transceiver device, each of said plurality of tracking units further including a tracking component determining the range and bearing of said object therefrom, each of said tracking units communicatively coupled to said base station.

17. The object locating system of claim 12 wherein said tracking unit is disposed on a vehicle.

18. The object locating system of claim 16 wherein said plurality of tracking units are disposed on a respective plurality of vehicles.

19. The object locating system of claim 12 wherein said tracking unit is a hand-held portable unit.

20. The object locating system of claim 12 further including a plurality of base stations.

21. The object locating system of claim 12 wherein said position determining system is selected from the class of satellite-based radio navigation systems consisting of the Global Positioning System and the Global Orbiting Navigation System.

22. The object locating system of claim 12 wherein said position determining system is selected from the class of ground-based radio navigation systems consisting of LORAN, Shoran, Decca, and TACAN.

23. The object locating system of claim 12 wherein said base station further includes a base station transmitter for transmitting said calculated position of said object to a desired location.

* * * * *